Patented Sept. 24, 1929

1,729,496

UNITED STATES PATENT OFFICE

LEO L. SIMPSON, OF BRYN MAWR, WASHINGTON, ASSIGNOR TO NEW ERA IRON AND STEEL CORPORATION, OF SEATTLE, WASHINGTON, A CORPORATION OF WASHINGTON

PROCESS OF MAKING BRIQUETTES OR NONMOLDED LUMPS OF COMMINUTED MINERALS FOR METALLURGICAL PURPOSES AND THE PRODUCT OF SAID PROCESS

No Drawing. Application filed November 15, 1923. Serial No. 674,960.

My invention relates to the process of making briquettes or non-molded lumps of comminuted minerals for metallurgical purposes and to the product of said process.

In setting forth my invention, I shall employ for purposes of illustration and description the problems presented by comminuted iron ores, or the like, but my invention is not to be deemed restricted to any such specific kind of metal, but is co-extensive with all metals involving like problems.

There are large deposits of iron-bearing ores in which the iron content is low, so that in the trade they are called low grade ores. Among these deposits are some hematites, martites and magnetites. These low grade ores are crushed or pulverized and for economical reasons concentrated, either magnetically or by the so-called wet process, by way of preparation for reduction, and hence present problems of reduction and treatment peculiar to comminuted ores. Also another source of comminuted iron ore occurs in the blast furnace flue dust from the down comers, which dust is a by-product in the reduction of iron ores, and the iron content in this dust is often high.

The reduction processes heretofore known have proved too expensive to render these deposits and sources commercially available as important sources of iron as compared to the high-grade ores or to the high grade ore mixtures. A primary object of my invention is to provide a process for treating said low grade ores, which process is characterized by effecting great economies over present day practice, whereby these low grade ore deposits may be made commercially available as sources of iron.

In reducing these comminuted iron ores in the blast furnace, it will be understood that their fineness requires their being formed into blocks or lumps of such proportions and weight that the blast or fluid pressure will not blow them out of the furnace. Also an other reason why the ore must be in lump form is to avoid clogging in the furnace, that is, so that there may be a free passage of the blast and burning gases through the burden. Hence, the problem arises of supplying these comminuted ores in suitable form for blast furnace charging and reduction. Manifestly, if these could be made into briquettes or non-molded lumps, the problem would be solved. Briquettes of such ores have been formed by employing residual oils and the binding properties of some of the asphaltic bases and some of the metallic salts. However, these briquettes have not stood up under blast to the necessary temperature for fusion and final reduction under blast furnace conditions. Sintering, nodulizing, or the like, has been resorted to for comminuted ores, but these processes involve the installation of very expensive machinery and very considerable fuel consumption, so that the treatment cost is very high.

The briquette should be characterized primarily by the quality of withstanding the forces of disintegration until the necessary temperature for fusion and final reduction of the metal in the particular ore being treated is attained. To this end, the cohesive force in the briquette must withstand the influence of water, heat, pressure, severe handling, (shocks), that is, must not be brittle, and preferably should have a certain amount of porosity. A serious objection obtains to briquettes as heretofore provided in that they absorb readily a large percentage of their weight in water, and after a relatively short time disintegrate.

Another primary requisite is that the cost of manufacturing such briquette must be low and the binder employed to hold the comminuted particles of ore together should be characterized by being very inexpensive. A primary object of my invention is to provide a binder, the cost of producing which is very low, since it is formed largely of materials which are available in large quantities at very low cost. At the same time a primary object of my invention is to reduce the noxious substances which have obtained in binders heretofore used or suggested, and provide a binder which will beneficiate during fusion and final reduction in the furnace by acting as a scavenger and as a reducing agent, thereby materially reducing the amount of fuel required, and effecting in this respect substantial economies.

Another primary requisite of a binder which operates to form the briquette or lump is that it must be of a character which will enable the briquette or lump to withstand disintegration in the blast furnace until the necessary temperature is reached for fusion and final reduction.

Another condition which obtains in the treating of some of these comminuted ores, and which presents a serious problem is this: Some of the ore deposits have both magnetite ores and martite ores mixed together in various percentages. In putting these deposits through the crushing machinery, the martite ore pulverizes readily and becomes practically dust with almost one operation, while the magnetite ore is just the opposite and does not become pulverized readily. Hence, the martite portion is then in a finely powdered condition and the magnetite portion is in a much less finely ground condition. When the binder is added in forming the lump or briquette, it functions efficiently with the more finely pulverized martite, but does not act so efficiently by way of binding with respect to the more coarse magnetite ore. It is thought the explanation for this is that the more finely pulverized martite absorbs more thoroughly the binder solution. Be it noted that this different action with respect to the martite and magnetite ores results in a segregation of the one ore as distinguished from the other. The effect of this is that the magnetite is not properly bonded. Thus, there results a lump or briquette which disintegrates with small shocks, and the ore is not practicably capable of being handled and used in regular blast furnace practice. The binders heretofore formed fail to take into consideration this difference in the effect that crushing has upon the different ores. A primary object of my invention is to provide a binder which will take into account such difference in the crushing operation, and it is a primary object to provide a binder of such intense cohesive quality that all objection to such difference in pulverizing effect will be overcome.

Lye has been long known as an element of binders, and the same has been used in relatively large amounts. However, serious objection obtains to all binder formulas in which lye is an element for two reasons. One reason is that lye, and particularly concentrated lye, is relatively expensive, and, be it noted, the expense item of an element is a very important feature where it must be used in connection with large quantity production such as occurs in the iron ore industry. Where such great quantities are involved, an item, which according to ordinary standards may be quite inexpensive, becomes very expensive and therefore prohibitive and quite impracticable as a material to be used in the reduction of iron ores. Furthermore, a second very serious objection obtains to utilizing lye as an element in binders in that it contains a large percentage of sodium salts. Where concentrated lye is utilized to the extent of one and one-half percent ($1\frac{1}{2}\%$),—i. e. one and one-half pounds ($1\frac{1}{2}\#$) to one hundred pounds ($100\#$) of briquetted or non-molded lump mass,—sodium salts occur to as high an extent as 1.316 pounds. Sodium salts are highly objectionable in that sodium has a damaging effect upon the furnace linings, tuyères, water blocks and other parts, and possibly also on the commercial product itself. Because of its sodium salts content, lye as a component of the binder should be reduced in the percentage employed to a minimum, and experience has taught that the evil effects of the sodium salts are only overcome when the amount of the said salts present are reduced to below one per cent (1%), i. e., when the active part of such sodium salts as borates is below one per cent. Reference is here made to the sodium salts that are introduced by way of the binder constituents. A primary object of my invention is to produce a binder which contains lye in proportions well within the limits, and which will not have injurious effects upon the parts of the furnace above named.

A series objection obtains to binder formulas wherein carbon is one of the constituents, first, on the ground of expense, and second, for the reason that briquettes or lumps made by formulas which utilize carbon seem to absorb water, and, therefore, do not meet one of the requirements named above as a requisite for a good binder. Ordinarily, the briquettes or lumps of ore must be stocked in the yards and, therefore, must be capable of withstanding water. To put carbon in with ores having martite ores as a part of the ore content results in the binder attacking more actively the carbon than the ores, and, therefore, the cohesiveness of the resulting product is not nearly as great as operating practice requires. A primary object of my invention is to provide a briquette or lump of ore having a binder which will absorb only the minimum amount of moisture, and, therefore, a briquette or lump of ore prepared with my binder will be characterized by its ability to withstand most severe shocks, so that it is capable of being stocked in the yard and will withstand the pressure of that portion of the ore piled on top thereof, or like conditions which involve a resisting of shocks and pressure. This insures the ore reaching the furnace in well-formed briquettes or lumps, as it is capable of withstanding the rough handling incident to the various operations of reducing ore.

Binder formulas of the prior art, which utilize diatomaceous earth as one of the elements of the binder, are objectionable in that said earth is ordinarily only very partially dissolved in the binder, and to the extent that it is not dissolved there is present in the binder a relatively inert portion that prevents the binder acting efficiently. A primary object of my invention is to provide a binder which has diatomaceous earth as one of its constituents, and at the same time to thoroughly dissolve practically all of the diatomaceous earth that is used in the binder.

I accomplish these objects by providing a binder having borax or its equivalent as a constituent of the binder. My experiments have proved that borax in combination with lye is a solvent for diatomaceous earth. Sodium salt in the form of borax, at least in combination with lye, does not seem to be accompanied with the same objectionable action upon the walls of the furnace and the associated parts as obtains when lye alone is used. Moreover, I attain the above objects by utilizing borax in certain limited proportions. If too high a percentage of borax is used, then it loses its effect, and if too little borax is used, it obviously loses its effect.

The ores presenting the most difficult problem as respects the producing of an efficient and suitable binder for briquetting the same are those ores containing magnetites and martites. For such I have found that the following binder formula produces a lump or briquette, which has the requisite qualities hereinbefore mentioned. I find that to briquette ninety-six pounds (96#) of concentrated magnetite and martite ore, by taking as a basic element for its opal silicious content two and one-half pounds (2½#) of diatomaceous earth, and as a solvent therefor one-half pound (½#) of commercial lye (sodium hydroxide) of standard strength, and by the addition of one pound (1#) of borax (biborate, or boron trioxide) as a stimulant to accomplish the complete solvent action of the lye upon the diatomaceous earth, and by mixing all this with eleven and one-half pounds (11½#) of hot water heated to about one hundred and seventy-five degrees (175°) Fahrenheit, there is produced a most effective binder for the comminuted grains of the minerals. The solid ingredients of the binder thus represent four pounds (4#), made up as follows: two and one-half pounds (2½#) diatomaceous earth, one-half pound (½#) commercial lye and one pound (1#) borax. The water is driven off during the drying operation in preparing the briquettes as hereinafter more fully set forth.

Thus, it may be stated that to briquette one hundred pounds (100#) of material, the formula would employ two and one-half percent (2½%) diatomaceous earth, one-half percent (½%) concentrated lye, one percent (1%) borax, and ninety-six percent (96%) ores or concentrates. The water, which is found necessary with the ores in relatively dry condition, varies from nine and one-half pounds (9½#) to eleven and one-half pounds (11½#), or, it may be stated, nine and one-half percent (9½%) to eleven and one-half percent (11½%). However, this is driven off as stated during the drying operation, and therefore forms relatively no part of the one hundred pound mass.

Binders of common practice, or binders heretofore suggested, briquette about eighteen hundred and forty pounds (1840#) to the ton, while my formula obviously briquettes about nineteen hundred and twenty pounds (1920#) to the ton, a gain of about five percent (5%). Thus, as respects the amount of concentrates bonded, it is seen that a great economy is effected by a binder made in accordance with my formula. It may be noted that the amount of sodium salts thus introduced through the binder formed in accordance with my formula is less than one-half of one percent (½%),—in short, well below the amount which experts in the industry specify, namely, the amount of said sodium salts, to avoid injurious effects upon the furnace and its parts, as above stated, must be kept to a minimum and not to exceed one percent (1%). The objectionable effect upon the furnace walls of the sodium salts seems to be overcome in part at least in the presence of diatomaceous earth. The active sodium salts present in my formula may be explained as follows: In one-half (½) pound of lye there would be about .435 pounds of active (as respects ill effect upon the furnace lining) sodium salts and in one (1) pound of borax there would be about .02 pounds of active sodium salts, said two per cent (2%) or .02 pounds being formed as the result of my experiments. I say "active" because, "a concentrated solution of borate behaves as if it contained sodium metaborate, free boric acid and an amount of caustic alkali....... The more dilute the solution the greater extent to which the hydrolysis occurs." (See Analytical Chemistry, Qualitative. Treadwell-Hall, volume 1, page 379, fifth edition.) Adding the above figures there would be about .455 pounds of sodium salts. Therefore, on the basis of one hundred pounds (100#) there would be less than one-half of one per cent (½%) sodium salts per one hundred pounds (100#).

I have also found that very satisfactory results may be obtained with deposits having magnetite and martite ores, where concentrated lye is used to the extent of seventy-five hundredths of one percent (.75%) by weight, powdered crude borax seventy-five hundredths of one percent (.75%), diatomaceous earth two and one-half percent (2½%), hot water nine and one-half percent (9½%). Magnetite and martite ores do not absorb moisture freely, and the percentages of water for the binder would naturally have to be altered in accordance with the moisture content of the ore.

In a binder such as constitutes my invention herein, it will be understood that the ore is first crushed and then concentrated, either by the magnetic process or by the wet process. If by the latter, the ore is allowed to lie in the stock yards until the water drains away and becomes relatively free of the water. It will be understood that magnetite and martite ores absorb little water. The next step in the operation is the preparation of the binder. The borax, lye and diatomaceous earth are thoroughly mixed dry. Then the water, previously heated to a temperature of about one hundred and seventy-five degrees (175°) Fahrenheit, is added and this thoroughly mixed with the solid portions just noted. Immediately violent reactions take place and continue for several minutes. When the binder is thus thoroughly mixed and prepared, it is added to the concentrates. When thoroughly mixed with the concentrates, the mass is then passed to the briquetting machinery, or the mass is reduced to small unmolded lump portions. Thereupon, it is subjected to a drying operation, such as in a dry kiln, to dry the same, previously eliminating all water possible. The drying operation in the dry kiln may proceed only so far as may be found necessary to render the briquettes or non-molded lumps capable of handling, that is, they need not be thoroughly dried. In this partially dried condition they may be immediately conducted to the blast furnace, and the drier they become, the harder they become, the heat from the blast furnace operating to dry them. By the time they reach the oxidizing zone they are very hard, remaining in such condition until they reach the fusion zone, where they become sticky or plastic, as distinguished from disintegrating. If not conducted directly to the blast furnace, the material is stocked in the yards where it may be allowed to stand until it is ready for the blast furnace.

The percentage of diatomaceous earth may vary from two percent (2%) to three percent (3%); concentrated lye to the extent of one-half of one percent (½%) to one percent (1%); borax to the extent of one-half of one percent (½%) to one and one-quarter percent (1¼%); and hot water from nine percent (9%) to twelve per cent (12%) for reasons above mentioned. I have found that the percentages for the binder ingredients as specified by my formula are most important and must be strictly observed for the proper briquetting of the same. The above percentages were determined in connection with ore analyzing as follows:—

|  | Per cent |
|---|---|
| Fe | 59.88 |
| S | .12 |
| Mn | .10 |
| SiO$_2$ | 15.60 |
| Al$_2$O$_3$ | .74 |
| CaO | 1.30 |

The important elements in the above that affect the binder proportions are the iron, the silica and the calcium content. The more iron there is present, obviously, the more borax and concentrated lye should be used to effect the proper scavenging and reducing action. The more free soluble silica there is present the less diatomaceous earth will be necessary. The more calcium or lime there is present in the ore, the less should be the percentage of concentrated lye employed. Variation in the quantity of calcium does not operate to greatly affect the proportions. A change of ten percent (10%) in the iron content would require an increase in borax and lye of about one-tenth of one percent ($\frac{1}{10}$%) each. The concentrating process of low grade ores ordinarily provides for an iron ore content in the resulting concentrates of about fifty-nine percent (59%), so that the formula provided herein is adapted to the most general situation. In an analysis of the binder the amount of silica undissolved was found to be present to the extent of approximately five percent.

In submitting the binder made in accordance with my formula to tests as respects its solvent action upon the diatomaceous earth, I have found that in formulas of prior practice containing lye to the extent of one percent (1%), diatomaceous earth two percent (2%) and water nine and one-half percent (9½%), only some sixty-six percent (66%) of the diatomaceous earth was dissolved, while in using my formula with one percent (1%) borax, one-half of one percent (½%) lye, two and one-half percent (2½%) diatomaceous earth, and eleven and one-half percent (11½%) water, some eighty-eight percent (88%) of the diatomaceous earth was dissolved.

Further, I have found in submitting to the absorption of water briquettes formed in accordance with formulas heretofore used, and in submitting briquettes formed of the same ore made with the binder embodying my formula, those made with prior art formulas will not stand the breaking test after only two hours' absorption of the water, while those made in accordance with my formula after twenty-four hours' exposure to the water, that is, being submerged therein, fully withstood the breaking test.

As to the heat test, I have found that the briquettes stood up to the fusing point, and operated efficiently where the furnace temperatures were as high as from twenty-eight hundred degrees (2800°) to three thousand degrees (3000°) Fahrenheit. Since borax is a powerful fluxing agent, it causes fusion to take place at a lower temperature, and thus as a powerful scavenger and reducing agent, it reduces the amount of coke which will be required to bring about the complete fusion, and thus introduces an economy in the process.

In submitting proportions and percentages, it must be remembered that the same are subject to variations depending upon the nature, condition, analysis of the comminuted materials to be briquetted, blast furnace operating conditions, and quality of the iron to be produced. These matters are in the hands of the metallurgists and the blast masters, who are governed by old established procedure, practical and technical. In the event that the ores contain objectionable matters, such as titanium, to an undue proportion, it is well known that the introduction of sodium sulphate will materially aid the fluxing of the titanium content, and will eliminate in this respect objectionable operating conditions. In the above, I have set forth a formula for practical application of the binder embodying my invention, and as indicated the principles governing the variations of the percentage. My formula is not adapted to treating ores containing two percent (2%) or more of zinc. A briquette may be formed of such zinc ores, but it seems that there is a reaction which takes place within the zinc and the sodium salts present, which operates to disintegrate the briquette. Moreover, in the furnace itself the zinc and sodium salts combine to actively attack the furnace linings.

The above sets forth only preferred forms of embodiment of my invention, and, obviously, changes may be made in the proportions within the limits indicated. Where "briquette" is used herein it is intended to include "non-molded mass". The examples given will serve as general guides for applying my invention.

I claim:—

1. A binder for metallurgical purposes formed by intermixing opal silicious matter, lye and borax.

2. A binder for metallurgical purposes formed by intermixing diatomaceous earth to the extent of two percent (2%) to three percent (3%) by weight of the briquetted or non-molded mass; concentrated lye to the extent of one-half of one percent (½%) to one percent (1%); borax to the extent of one-half of one percent (½%) to one and one-quarter percent (1¼%); and hot water nine percent (9%) to twelve percent (12%).

3. A binder for metallurgical purposes formed by intermixing diatomaceous earth to the extent of two and one-half percent (2½%) by weight of the briquetted or non-molded mass; lye one-half of one percent (½%); borax one percent (1%); and hot water eleven and one half per cent (11½%).

4. The process of preparing a binder for metallurgical purposes comprising mixing diatomaceous earth, lye and borax in hot water.

5. The process of making a briquette of comminuted ore for use in the reduction of said ore, consisting of adding to and intermixing with said comminuted ore a binder composed of silicious matter, borax, lye and hot water.

6. The process of making a briquette of comminuted ore for use in the reduction of said ore, consisting of adding to and intermixing with said comminuted ore a binder containing two and one-half percent (2½%) diatomaceous earth by weight of the briquetted or non-molded mass, one-half of one percent (½%) lye, one percent (1%) borax, and eleven and one-half percent (11½%) water, and drying said briquette or non-molded mass.

7. A briquette for reduction of metallic ore content thereof, formed by intermixing ninety-six percent (96%) comminuted ore by weight of the briquetted or non-molded mass, two and one-half percent (2½%) diatomaceous earth, one-half of one percent (½%) lye, and one percent (1%) borax.

In witness whereof, I hereunto subscribe my name this sixth day of November, A. D. 1923.

LEO L. SIMPSON.